(12) United States Patent
Robbins

(10) Patent No.: US 7,069,654 B2
(45) Date of Patent: Jul. 4, 2006

(54) ROTOR BALANCING

(75) Inventor: William E. Robbins, Bristol (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 10/743,002

(22) Filed: Dec. 23, 2003

(65) Prior Publication Data

US 2004/0168291 A1 Sep. 2, 2004

(30) Foreign Application Priority Data

Feb. 27, 2003 (GB) .................................. 0304473.2

(51) Int. Cl.
*B23P 15/04* (2006.01)
*B23Q 17/00* (2006.01)

(52) U.S. Cl. .................. 29/889.23; 29/406; 29/407.08; 73/455; 73/461

(58) Field of Classification Search ............. 29/888.08, 29/888.1, 407.05, 407.08, 406, 889.23; 73/455, 73/458, 460, 461
See application file for complete search history.

(56) References Cited

U.S. PATENT DOCUMENTS

| | | | | |
|---|---|---|---|---|
| 2,327,606 A | * | 8/1943 | Saltz | ........................... 451/49 |
| 2,804,775 A | * | 9/1957 | Hack | ........................... 73/461 |
| 3,076,363 A | * | 2/1963 | Hack | ........................... 82/117 |
| 4,170,896 A | * | 10/1979 | Korkosz | ........................ 73/66 |
| 4,545,021 A | * | 10/1985 | Suzuki et al. | ............... 700/279 |
| 6,354,780 B1 | * | 3/2002 | Davis et al. | ................ 414/146 |
| 6,405,434 B1 | * | 6/2002 | Landolt et al. | ............... 29/889 |
| 6,532,848 B1 | * | 3/2003 | DeRegnaucourt et al. | ... 82/1.11 |
| 6,647,784 B1 | * | 11/2003 | Kashiwai et al. | ............. 73/458 |

FOREIGN PATENT DOCUMENTS

| | | |
|---|---|---|
| DE | 100 35 030 A1 | 9/2001 |
| EP | 1 188 900 A2 | 3/2002 |
| WO | WO 2004/048918 A1 | 6/2004 |

OTHER PUBLICATIONS

DE 100 35 030 Derwent English Abstract. 2001.*

* cited by examiner

*Primary Examiner*—Eric Compton
(74) *Attorney, Agent, or Firm*—Oliff & Berridge, PLC

(57) ABSTRACT

A method of balancing a rotor (10), the said method comprising the steps of determining the position of the center of mass of a rotor (10) to be balanced prior to the rotor (10) being machined to its final dimensions, and machining the rotor (10) to its final dimensions by removing material substantially along the length of the rotor (10). The material is removed in the direction of its axis such that the center of mass of the rotor is adjusted to be substantially co-incident with its axis of rotation (22).

12 Claims, 3 Drawing Sheets

ROTOR BALANCING

This invention relates to rotor balancing and in particular the permanent balancing of rotors by the removal of material from the rotor to correct unbalance.

BACKGROUND

Rotating components such as wheels, crankshafts, drive shafts, gas turbine engine rotors etc, are balanced using various balancing methods which can be considered as either permanent or non permanent. In permanent balancing material is removed from the component to be balanced while in non-permanent methods balanced weights are added to the rotary component.

Rotating components can be balanced by the removal of material from specific balancing lands provided on the component to be balanced, or by the method of mass centering where location features, for example bearing surfaces, are offset machined to compensate for unbalance. In the method of mass centering the location features of the component are machined to their final dimensions such that the position of the axis of rotation, as determined by the location features, is made to be coincident with the center of mass of the component.

There are a number of disadvantages associated with mass centering. One disadvantage is that the component to be balanced is heavier than it would otherwise have to be because of the provision of relatively large balancing lands. Another disadvantage is that slave location features are required to hold the component while the normal location features are machined to their final dimensions. The requirement for relatively large lands and slave location features can add significantly to the weight of the component and this is a significant consideration in gas turbine aero engine applications.

Gas turbine engine rotors have traditionally been balanced using the weight variation present in a set of aerofoil blades to correct not only the disc unbalance but also that of the blades. This has been possible because the rotor blades have traditionally been attachably/detachably mounted in slots provided in the rim of the rotor disc so that the blades can be distributed around the circumference of the disc in such a way that the variations in their weight can be used to compensate for disc and blade unbalance. The net effect of this approach is a balanced bladed disc assembly having zero unbalance.

SUMMARY

Recent improvements in manufacturing technologies have enabled bladed discs, also referring to as blisks, or bliscs, to be manufactured with the rotor disc integrally formed with the rotor blades. Blisks may be machined from solid, but more usually the blades are friction welded to the rim of the disc. Blisks have a number of advantages when compared with more traditional blade and disc assemblies since the weight associated with the mounting features of the blade and disc can be eliminated from the rotor, and therefore blisks are increasingly used in modern gas turbine engines. The use of blisks, however, presents a new problem to the gas turbine engine designer in terms of rotor balancing since the method of using the mass variation present in a set of blades and balancing the rotor assembly accordingly is no longer available. The use of mass centering is not desirable for the aforementioned reasons, and therefore there is a requirement for a more appropriate balancing method for balancing rotors, and blisks in particular.

According to an aspect of the invention there is provided a method of balancing a rotor; the said method comprising the steps of:

determining the position of the center of mass of a rotor to be balanced prior to the rotor being machined to its final dimensions;

machining the rotor to its final dimensions by removing material substantially along the length of the rotor in the direction of its axis such that the centre of mass of the rotor is adjusted to be substantially co-incident with its axis of rotation.

One of the main advantages of using the method of the above aspects of the invention is that the weight of the rotor can be significantly reduced by significantly reducing the size of the balance correction lands present on the rotor. It is preferable that the above method is used to balance the rotor within predetermined limits as determined by the manufacturing tolerances for the rotor, and then correct relatively minor levels of unbalance by offset machining the balance correction lands to more finely balance the rotor. In this way the method of the present invention can be used to correct the major part of the unbalance in the rotor such that the size of the balance lands required for fine correction can be significantly reduced.

The balancing method of the present invention is different to that of mass centring since in the present method the rotor is machined to its final dimensions such that the centre of mass of the rotor is moved to be coincident with the axis of rotation, while in mass centring it is the axis of rotation of the rotor that is moved to be coincident with the centre of mass by machining the rotor location features.

The method comprises the step of determining an offset representative of the eccentricity of the centre of mass of the unbalanced rotor with respect to the said axis of rotation, and applying the offset to machine the rotor to its final dimensions such that the geometric centre of at least part of the rotor is offset with respect to the axis of rotation to balance the rotor. The offset is preferably 1 mm or less and therefore the unbalanced rotor is first pre-machined to allow an offset of 1 mm or less to be applied to the rotor during final machining.

Preferably, the rotor comprises a hub having a bore and the bore is machined such that its geometric centre is offset with respect to the said axis of rotation by an amount equal to the offset dimension and in the direction of the said eccentricity. Thus, the diameter of the bore may initially be 1 mm or so undersize to enable the bore to be machined with an offset of that amount or less when machined to its final dimensions during the balancing thereof.

Conveniently, the bore is machined to its final dimension by a machine tool cutter centred on the centre of mass of the unbalanced rotor. In this way the bore can be machined with the correct offset applied to the bore so that substantially more material is removed from the side of the disc on which the centre of mass of the unbalanced rotor is located.

The rotor comprises an outer periphery, and the outer periphery may additionally or alternatively be machined such that its geometric centre is offset with respect to the said axis of rotation by an amount equal to the said offset dimension and in a direction opposite to that of the said eccentricity. In this way rotor unbalance may be corrected by machining either the bore or the outer radially annular part of the rotor or both.

Conveniently, the offset dimension or eccentricity is determined by the static unbalance of the unbalanced rotor, the average diameter of the material to be removed and the length of the rotor over which material is to be removed. The offset dimension (or eccentricity) is determined by the formula: $e=(4\times U)/(\pi\times D^2\times L\times\rho)$, where U is the static unbalance of the unbalanced rotor, D is the average diameter of the material to be removed from the unbalanced rotor, L is the axial length of the rotor over which material is to be removed and ρ is the density of the rotor material. The offset required to correct the unbalance of the rotor is calculated using the above formula. Thus, the method of the present invention is particularly suitable where the offset dimension required to correct unbalance in the rotor is relatively large in comparison with the manufacturing tolerance of the part of the component to be machined.

The rotor may comprise a turbine disc or compressor, preferably a gas turbine engine disc, more preferably a turbine or compressor blisk, that is to say a disc having integrally formed blades instead of attachably/detachably mounted blades. With conventional gas turbine engine disc and blade assemblies the level of unbalance is relatively low and offset dimensions calculated in accordance with the above mentioned formula are typically of the same order as the manufacturing tolerance and therefore it may not be economically practical to reduce initial unbalance in such assemblies. However the high level of unbalance commonly found in blisk results in offset dimensions much greater than the manufacturing tolerances required and therefore the method of the present invention provides a practical and cost effective way of reducing initial blisk unbalance. The method of the present invention therefore has particular advantages where the initial unbalance of the rotor is relatively high and/or in applications where manufacturing tolerances are relatively low.

The present invention also contemplates a rotor balanced according to the above method and in particular a gas turbine engine disc or blisk balanced according to the method of the invention.

BRIEF DESCRIPTION OF DRAWINGS

Various embodiments of the invention will now be more particularly described, by way of example only, with reference to the accompanying drawings, in which.

DETAILED DESCRIPTION OF EMBODIMENTS

Figure 1:
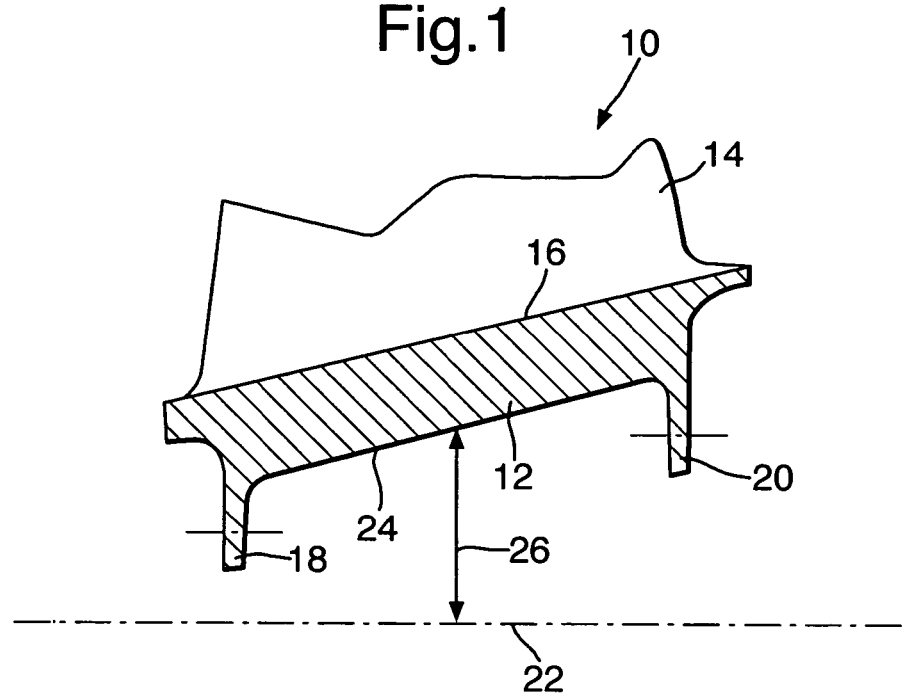
FIG. 1 is a partial cross section axi-symmetric view of a blisk rotor stage in a gas turbine engine.

Referring to FIG. 1, a rotor stage of a gas turbine engine comprises a blisk 10 which comprises a disc part 12 and a plurality of circumferentially spaced aerofoil blades 14 which extend radially outwards from the disc rim 16. The blisk is provided with forward and rearward mounting flanges, 18 and 20 respectively, for mounting the blisk to a shaft (not shown) of the gas turbine engine for rotation about the engine axis 22.

In the drawing of FIG. 1 the adjacent engine components are omitted for clarity and only part of the blade 14 is shown, ie that nearest the disc. The rotor stage 10 may be a compressor rotor stage or a turbine rotor stage since the method of the present invention is applicable to balancing both turbine and compressor rotors.

In the method of the invention, prior to finish machining the blisk of FIG. 1 to its final dimensions shown in FIG. 1, the blisk is machined so that the average diameter 26 of the blisk's radially inner surface 24, within the central bore of the disk, is slightly smaller than the final diameter of the finished disc. This is more readily seen in the drawing of FIG. 2 where the undersize bore diameter is indicated by the line 28 which represents the bore surface prior to finish machining the blisk to its final dimensions. In a typical example the diameter of the bore of the blisk is about 1 mm undersize prior to finish machining. This additional material enables the bore to be finish machined with its geometric centre offset from the axis of rotation 22 to compensate for eccentricity of the centre of mass of the blisk with respect to the axis 22.

The static unbalance of a rotor may be determined in accordance with the following formula;

$$U=\pi\times D^2\times L\times e\times\rho/4$$

where, U represents the static unbalance, D represents the average diameter of the surface to be finish machined, L is the axial length of the part of the component being offset machined, e represents the offset or eccentricity to be applied, and ρ is the density of the component material.

It follows therefore that the eccentricity (e) required to correct static unbalance is $$e=(4\times U)/(\pi\times D^2\times L\times\rho)$$

Figure 2:
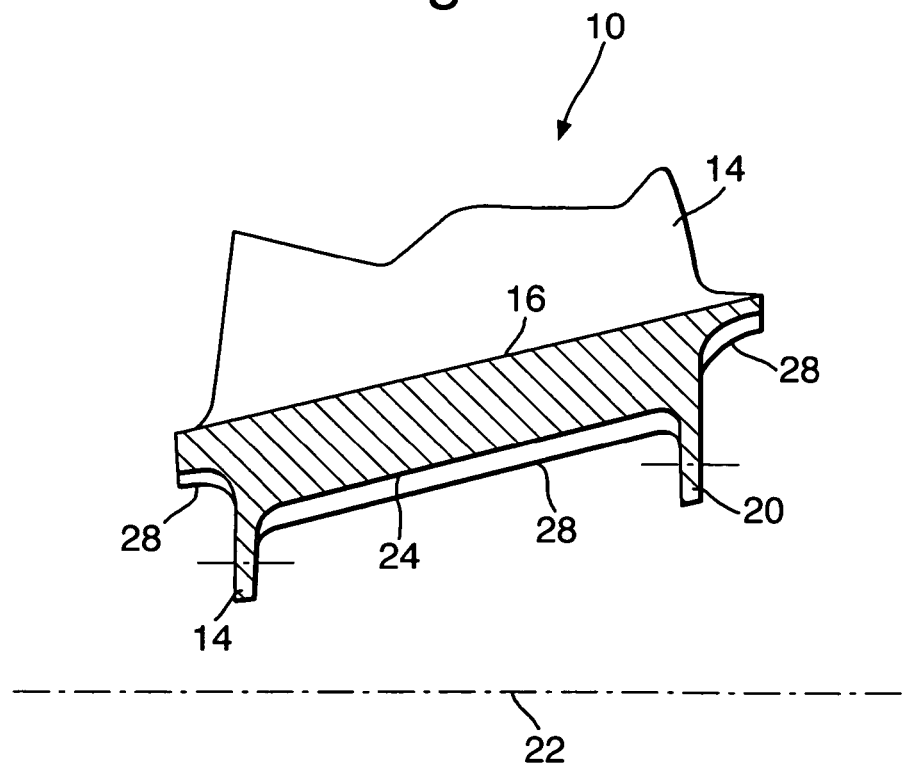
FIG. 2 is a view similar to that of FIG. 1 which shows material to be removed from the blisk in a final machining step in a method of balancing the blisk in accordance with an embodiment of the present invention.
Figure 3:
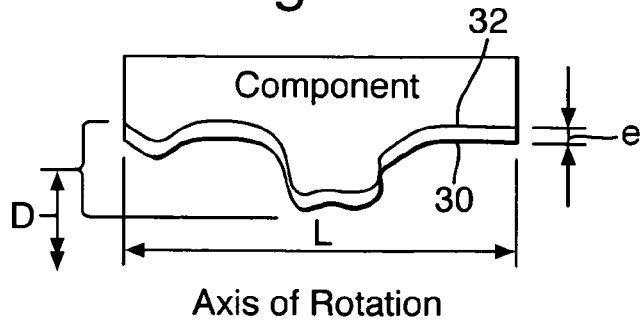
FIG. 3 is a schematic representation of a rotatable component having an irregular shaped central bore for the purpose of illustrating the calculation of the offset to be applied in the method of the present invention.

The above referenced parameters are illustrated in the drawing of FIG. 3 which shows the internal circumference of a rotor having a bore of irregular shape. The view of FIG. 3 is similar to that of FIGS. 1 and 2 in the sense that it shows an axi-symmetric cross section view of the rotor. As can be seen in the drawing of FIG. 3 the offset (e) is shown applied to the outline of the rotary components such that the solid line 30 represents the outline of the inner diameter before finish machining and the chained line 32 represents the outline of the internal diameter after the component has been finish machined to its final dimensions. It is to be understood that the offset (e) results in different amounts of material being removed from different parts of the inner diameter around its circumference, since the offset is applied in the direction (angular position) of the centre of mass of the rotary component prior to finish machining.

The principle of offset machining to compensate for static unbalance in a rotor is illustrated with reference to FIGS. 4a and 4b. In this example balancing is achieved by removing material from the outer circumference of the component to be balanced rather than the radially inner circumference or radially inner bore surface in the examples of FIGS. 1 to 3.

Figure 4A:
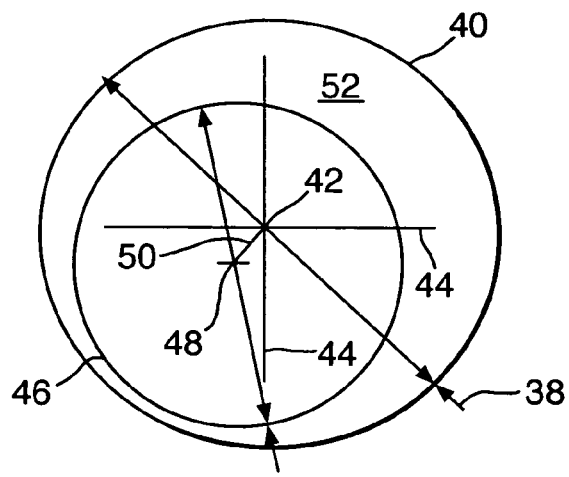
FIG. 4a is a schematic representation of an offset vector in the plane of a rotor.
Figure 4B:
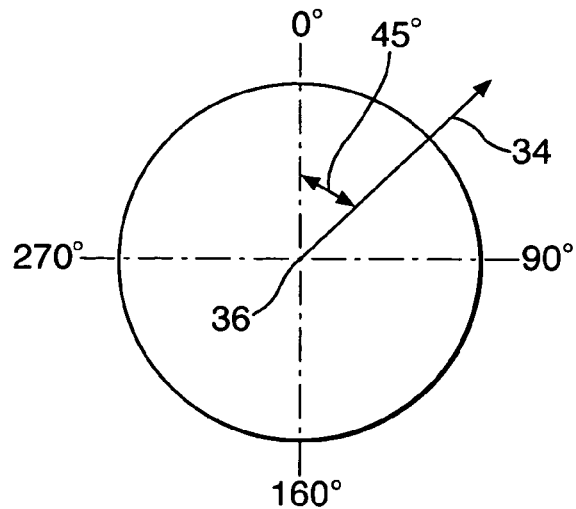
FIG. 4b is a schematic view of a rotor in a plane perpendicular to the rotor's axis of rotation, illustrating the application of the offset to the final machining of the external circumference of the rotatable component.

FIG. 4a is a vector diagram showing the direction, or angular offset, of the centre of mass of the rotor to be balanced prior to finish machining. The angular offset vector 34 is shown with respect to a coordinate reference frame passing through the axis of rotation of the rotor represented by the point 36 in the drawing of FIG. 4a. In the drawing of FIG. 4b the diameter 38 of the outer circumference 40 of the rotary component is greater than is required in the finish component to allow material to be removed for balancing. In the drawing of FIG. 4b the geometric centre of the outer circumference 40 and the axis of rotation are coincident and represented by the point 42 at the centre of the cross hairs 44. The outer circumference 46 of the finish machined rotary component has a geometric centre represented by point 48 in the drawing which is offset from the geometric centre 42 by a distance 50 as determined by the above mentioned equation. Thus the distance between the geometric centres 42 and 48 is equivalent to the eccentricity of the mass centre of the unbalanced rotary component having the external circumference 40. In this example the component is to be balanced by removing material from the outer circumference and therefore the offset 50 is applied in a direction diametrically opposite that of the unbalance vector 34, that is to say with an offset angle equal to that of the vector 34+180°. In the example of FIGS. 4a and 4b the material in the region 52 between the outer circumference 40 of the unbalanced rotary component and the circumference 46 of the finish machined component is removed in the balancing process. In applications where the rotary component is machined using a machine tool cutter, the cutter may simply be centred on the geometric centre 48 to remove the unwanted material in the region 52 bounded by the circumferences 40 and 46. Preferably the cutter is controlled by a numerically controlled machine tool.

It is to be understood that in balancing methods of the aforementioned type the offset is applied in the direction of the vector 34 where material is to be removed from the surface of the inner circumference of an internal bore, such as that defined by surface 24 in the blisk 10 of FIGS. 1 and 2.

In the method of the present invention material is removed along substantially the whole length of the component to be balanced and in the rotor of FIGS. 1 and 2 material may be removed in the region between the flanges 18 and 20 and on the other sides of the flanges as indicated by lines 28 in FIG. 2. Material may also be removed additionally or alternatively from the gas washed surface at the rim 16 of the disc between the aerofoil blades 14.

Figure 5:
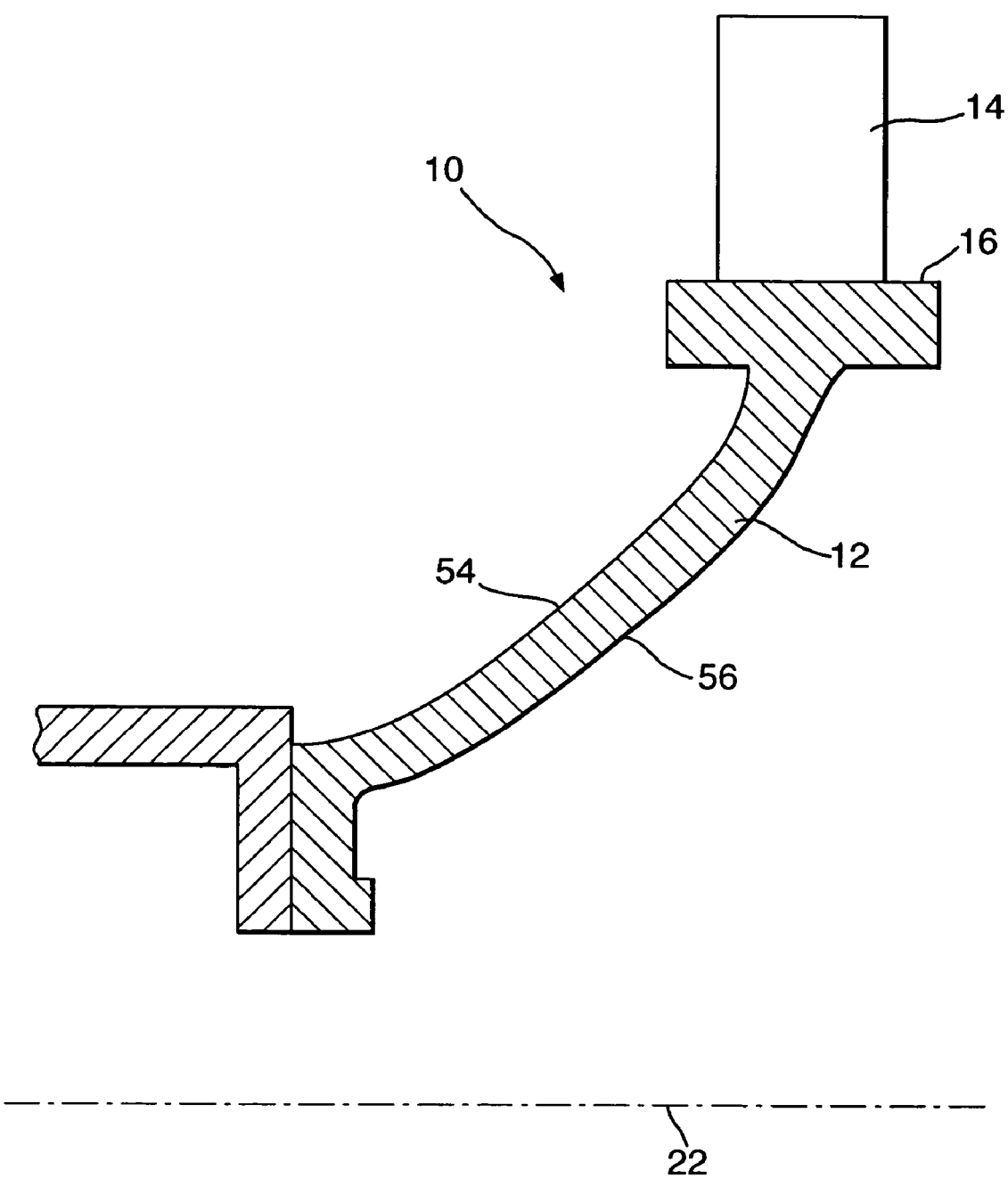
FIG. 5 is a view similar to that of FIG. 1 of a blisk rotor stage having a different configuration to that of FIG. 1.

Referring now to FIG. 5 which shows alternative blisk arrangement where the disc part 12 of the blisk extends radially and axially and may be offset machined along the downstream 56 side of the blisk, as indicated to the right of the drawing in FIG. 5, or on the upstream side 54 as indicated to the left of the drawing in FIG. 5.

Although aspects of the invention have been described with reference to the embodiments shown in the accompanying drawings, it is to be understood that the invention is not limited to those precise embodiments and that various changes and modifications may be effected without further inventive skill and effort. For example, the invention may be used for balancing components other than blisk rotor stages in gas turbine engines, and may be used for balancing any type of rotational component where the initial unbalance is relatively high and generally too high for correcting by known methods of machining balance correction lands.

The invention claimed is:
1. A method of balancing a rotor, comprising:
    determining the position of the centre of mass of a rotor to be balanced prior to the rotor being machined to its final dimensions, the rotor comprising at least one of a compressor rotor stage or a turbine rotor stage for a gas turbine engine, and including a radially inner periphery and a radially outer periphery; and
    machining the rotor to its final dimensions by removing material from at least one of the radially inner periphery of the rotor or the radially outer periphery of the rotor, substantially along the length of the rotor in an axial direction, thereby substantially adjusting the centre of mass of the rotor to be co-incident with the axis of rotation of the rotor,
    wherein, in machining the rotor to its final dimensions, material may be removed from any discrete point, any series of discrete points, or continuously along an entire axial length of the rotor rather than from a discrete axial section where material has been added in the manufacturing process as a balance land to be later removed.
2. The method as claimed in claim 1, further comprising:
    determining an offset representative of the eccentricity of the centre of mass of the unbalanced rotor with respect to the axis of rotation; and
    applying the offset to machine the rotor to its final dimensions such that the geometric centre of at least part of the rotor is offset with respect to the axis of rotation to balance the rotor.
3. The method as claimed in claim 2, wherein the rotor comprises a hub having a bore and the bore is machined such that its geometric centre is offset with respect to the axis of rotation by an amount equal to the offset dimension and in the direction of the eccentricity.
4. The method as claimed in claim 3, wherein the bore is machined to its final dimension by a machine tool cutter centred on the centre of mass of the unbalanced rotor.
5. The method as claimed in claim 2, wherein the radially outer periphery of the rotor is machined such that its geometric centre is offset with respect to the axis of rotation by an amount equal to the offset dimension and in a direction opposite to that of the eccentricity.
6. The method as claimed in any of claim 2, wherein at least one of the offset dimension or eccentricity is determined by the static unbalance of the unbalanced rotor, the average diameter of the material to be removed and the length of the rotor over which material is to be removed.
7. The method as claimed in claim 6, wherein at least one of the offset dimension or eccentricity is determined by the formula: $e=(4\times U)/(\pi \times D^2 \times L \times \rho)$, where U is the static unbalance of the unbalanced rotor, D is the average diameter of the material to be removed from the unbalanced rotor, L is the axial length of the rotor over which material is to be removed and p is the density of the rotor material.
8. The method as claimed in claim 1, wherein the rotor comprises at least one of a compressor or turbine disc.
9. The method as claimed in claim 1, wherein the rotor comprises at least one of a compressor or turbine blisk.
10. A method of machining a rotor as claimed in claim 1.
11. A rotor balanced according to the method of claim 1.
12. A gas turbine engine disc or blisk balanced according to the method of claim 1.

* * * * *